Patented Apr. 28, 1936

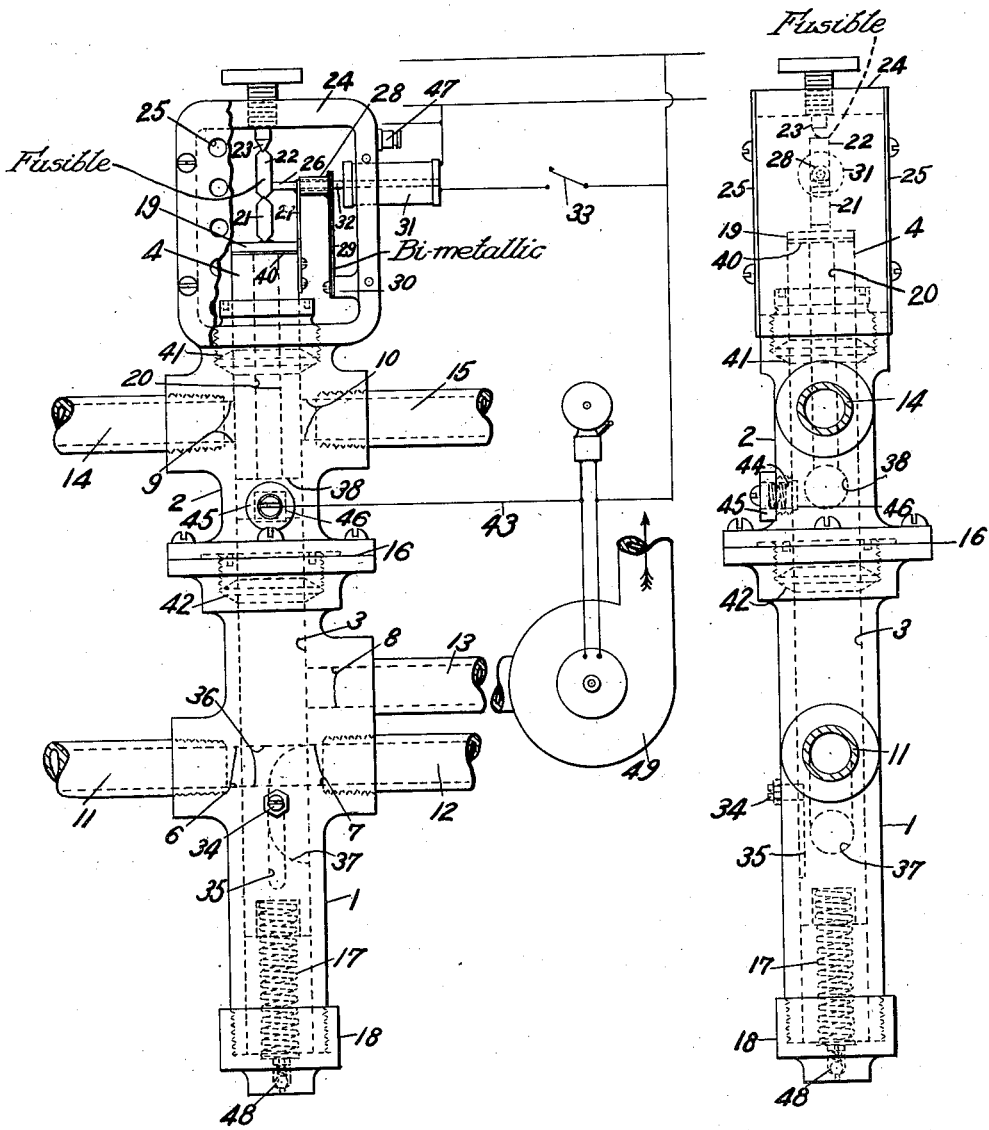

2,038,619

UNITED STATES PATENT OFFICE 2,038,619

MULTIPLE-OPERATED EMERGENCY VALVE

Kenneth Watson, San Francisco, Calif.

Application May 7, 1934, Serial No. 724,229

14 Claims. (Cl. 169—37)

This invention relates to automatic emergency valves for shutting off gases of various kinds or other dangerous fluids in case of fire or other hazard, and it has for its objects a valve of this kind which will be operated by a plurality of means so that in case of failure of one another will automatically function, also such a valve which may be operated from a remote point independently of its automatic features. Also such a valve which will shut off or change the direction of flow of a plurality of pipes simultaneously; also such a valve which will give an alarm at a distant point when it does operate; also which may release a spray of water adjacent the point of the overheating which may have actuated it; also such a valve which will be simple in construction, cheap to make and install, and which may be depended to function after possible very long periods of idleness. Other features and advantages of the invention will appear in the following description and accompanying drawing.

In the drawing Fig. 1 is an elevation of my improved emergency valve with parts broken away to reveal the construction.

Fig. 2 is a side view of Fig. 1.

In further detail, the valve comprises an elongated body or housing made in two sections 1 and 2 flanged and bolted together at 16 having a round bore 3 of uniform diameter extending straight through it and fitted inside with a smoothly fitting slidable plunger or piston 4, which passes and may close several side outlet ports 6, 7, 8, 9, and 10 which are connected to several pipes 11, 12, 13, 14, and 15, and which piston is normally urged upward by a stiff coiled spring 17 positioned between the lower end of the piston and a screw-threaded cap 18 screwed over the lower end of the valve. The upward tendency of the piston 4 is arrested by a cap member 19 which is seated over a bore 20 in the upper end of the piston and which cap is held in place by means of a pair of toggle members 21 and 22 arranged for quick releasing by a variety of means to be described.

Member 21 is a short small square rod with a flat pointed or chisel-shaped edge at each end, the lower one fitting into a slight V seat formed in the cap member 19 and the upper end seated in a slight V seat formed in the lower end of member 22 which is also a short small square rod, though formed with a small V seat at both ends. The upper end of member 22 is held in place by the V point of a set screw 23 threaded through a cage or frame member 24 formed on the upper end of the body and surrounded with a shell 25 of perforated metal so as to freely pass changes of air temperature as well as water when the device operates as a sprinkler head.

One of the short metal rods at least, preferably member 22, is of easily fusible alloy as used generally in automatic fire sprinklers, and they are sustained just slightly out of line so that they will not collapse through force of spring 17, this being effected by means of a small side support 26 attached to a flat vertical spring 27 secured at its lower end to the outer side of the upper end of the projecting piston, while in back of spring 27 is a further supporting device 28 which takes the shape of a hollow tube or spool secured to the upper end of a flat bimetallic strip 29 secured at its lower end to a boss 30 on cage frame member 24. Spool 28 just touches spring 27 behind device 26 to support the toggle links slightly within the vertical center line through their fulcrums so as to stabilize the arrangement.

The arrangement of the bimetallic strip 29 is such that upon becoming heated it will warp in direction of the toggles 21—22 and push them beyond the center line so that they will collapse through the force of spring 17.

Besides the fusible link release (member 22) and the thermostatic release 28—29, still another release is provided in the form of an electric solenoid 31 with its retracted core 32 projecting into hollow spool 28 and just about touching the back of spring 27 so that upon energizing the solenoid as by a circuit switch 33 as from a remote point—such as the clerk's office in a hotel installation—the solenoid core will at once be forced outwardly and disrupt the toggle joint.

When, by any of these three modes, the toggle is opened the piston will instantly fly upward to the limit of travel permitted by a screw 34 projecting through the housing into a slot 35 formed in the piston, and which slot and screw arrangement also prevents turning of the piston and misalignment of its ports 36, 37, 38, with the side outlet pipes as these ports are so arranged that when the valve is "set" for use, pipes 11 and 12 will be directly connected through ports 36—37 and pipes 13, 14, and 15 will be shut off by the blank sides of the piston, and when the valve is sprung or released the piston will be forced to the top of its stroke to thereby shut off pipe 11, open pipe 12 to pipe 13 through curved port 37, and open pipe 14 to pipe 15 through port 38 as well as open these last two pipes (which may be water pipes) to bore 20 leading out of the upper end of the piston when cap 19 is released and thus throw a spray of water out of the perforated sides 25 of the cage. To make the cap proof against any possible leakage from any seepage along the piston when the valve is set it may have a gasket disk 40 between it and the upper end of the piston; also to prevent other leakage along the piston sides stuffing boxes may be arranged at 41 and 42 as indicated.

When the valve as shown in Fig. 1 is sprung or released by any of the various means described it will at once close an electric circuit 43 to an alarm bell or other alarm device at any remote point desired. This is accomplished by extending the wire 43 to a spring-actuated brush 44 or similar contact mounted in an insulated sleeve 45 in the side of the housing, and having the inner end of the brush bear on a small disk of insulating material 46 countersunk into the surface of the piston immediately under the brush, so that the moment the disk is carried from under the brush by movement of the piston the brush will contact the metal of the piston and complete the circuit through the grounded connection 47.

To provide against possible leakage of the contents of pipe 11 or 12 down the sides of the piston, especially if ammonia gas or other noxious fluid, and yet permit quick upward movement of the piston without forming a vacuum under its lower end, I may provide a small inwardly opening spring check valve in lower cap 18 as indicated at 48.

My valve as above described may be used under various conditions where it is necessary to quickly shut off one or more pipes, change the flow of others, and/or operate sprinklers, for pipe 15 may lead from a high pressure water supply source for operating any number of sprinklers along pipe 14 and also may send a spray from the valve cage if port 20 is used. Pipe 11 may be supplying ammonia gas through pipe 12 to a cold storage room when the valve is set, and when sprung it will at once shut off pipe 11 and vent the cold storage room system to the outer atmosphere through pipe 13, so that in case of a fire this will automatically take place upon melting of fusible link 22, or, if this should fail, by heating of bimetallic strip 29, or if no fire and an ammonia pipe should burst, a mere closing of switch 33 will effect the same result, so that the supply of dangerous gas will be shut off and the burst piping and storage room vented of their noxious contents through pipe 13, it being understood that an electric-driven suction fan 49 may be included in vent pipe 13 and set in motion by the closing of the alarm circuit if desired to expedite the exhausting action.

My valve as described is not limited to use with noxious gases, but may be used for dangerous liquids such as gasoline and other fuel lines which must be cut off in case of fire, or acids in chemical works. Also to be observed is that vent pipe 13 need not always be used, or if used it may be a drain discharge to sewer if liquids are used in pipes 11 and 12. Also that it is manifest that any number of additional pipes may be incorporated in my valve besides those shown as the valve piston and housing may be of any desired length or size.

I therefore claim:—

1. An emergency valve comprising a housing having a bore, a piston slidable in said bore, a plurality of ports opening through the side of said housing adapted for respectively connecting to pipes leading therefrom, ports formed in the piston arranged respectively for connecting some only of the housing ports while disconnecting others when the piston is slid one way and vice versa when slid in the opposite direction, a spring urging the piston toward one direction, a toggle link resisting the movement of the piston in said direction and thermostatic means arranged to trip said toggle link for tripping the valve upon a predetermined dangerous temperature being reached.

2. An emergency valve comprising a housing having a bore, a piston slidable in said bore, a plurality of ports opening through the side of said housing adapted for respectively connecting to pipes leading therefrom, ports formed in the piston arranged respectively for connecting some only of the housing ports while disconnecting others when the piston is slid one way and vice versa when slid in the opposite direction, a spring urging the piston toward one direction, toggle links resisting the movement of the piston in said direction and thermostatic means arranged to trip said toggle links upon a predetermined dangerous temperature being reached for tripping the valve, one of said links being formed of easily fusible alloy to melt and disrupt the toggle links when overheated.

3. An emergency valve comprising a housing having a bore, a piston slidable in said bore, a plurality of ports opening through the side of said housing adapted for respectively connecting to pipes leading therefrom, ports formed in the piston arranged respectively for connecting some only of the housing ports while disconnecting others when the piston is slid one way and vice versa when slid in the opposite direction, a spring urging the piston toward one direction, toggle links resisting the movement of the piston in said direction and thermostatic means arranged to trip said toggle links upon a predetermined dangerous temperature being reached for tripping the valve, one of said links being formed of easily fusible alloy to melt and disrupt the toggle links when overheated, and independent means operated by remote control arranged and adapted to disrupt said toggle links.

4. An emergency valve comprising a housing having a bore, a piston slidable in said bore, a plurality of ports opening through the side of said housing adapted for respectively connecting to pipes leading therefrom, ports formed in the piston arranged respectively for connecting some only of the housing ports while disconnecting others when the piston is slid one way and vice versa when slid in the opposite direction, a spring urging the piston toward one direction, toggle links resisting the movement of the piston in said direction and thermostatic means arranged to trip said toggle links upon a predetermined dangerous temperature being reached for tripping the valve, one of said links being formed of easily fusible alloy to melt and disrupt the toggle links when overheated, and independent means operated by remote control arranged and adapted to disrupt said toggle links, the latter means comprising an electric solenoid mounted on the valve structure and with its slidable core arranged to push the toggle links over center upon closing the solenoid circuit.

5. In a structure as specified in claim 1, an electric alarm circuit-closing means actuated upon the tripping of said valve.

6. In a structure as specified in claim 1, a water sprinkler head incorporated in said housing and a water supply port opened thereto upon tripping of said valve.

7. In a structure as specified in claim 1, two of said pipes connected for conveying a dangerous fluid to a point of use when the valve is set with said toggle link in position resisting the movement of said piston, and the porting of the piston so arranged as to shut off the supply pipe of said dangerous fluid and open the continuing pipe to a vent or drainage pipe connected to the valve housing when the valve is in tripped position.

8. In a structure as specified in claim 1, two of said pipes connected for conveying a dangerous fluid to a point of use when the valve is set with said toggle link in position resisting the movement of said piston, the porting of the piston so arranged as to shut off the supply pipe of said dangerous fluid and open the continuing pipe to a vent or drainage pipe connected to the valve housing, when the valve is in tripped position an exhaust device on said vent or drainage pipe, and means actuated by tripping of the valve for operating said exhaust device.

9. An emergency valve comprising an elongated housing provided with a through bore, an elongated bar piston slidably positioned in said bore, a spring at one end of the piston tending to force it toward the opposite end, means including a fusible link at said opposite end of the piston holding it against the spring pressure when the valve is set, a plurality of pipe ports along the sides of the housing opening to said bore, and ports in said piston arranged to connect some of said pipe ports as the piston occupies one of the extreme positions and disconnect others, and vice versa when in the opposite extreme position.

10. An emergency valve comprising an elongated housing provided with a through bore, an elongated bar piston slidably positioned in said bore, a spring at one end of the piston tending to force it toward the opposite end, means including a fusible link at said opposite end of the piston holding it against the spring pressure when the valve is set, a plurality of pipe ports along the sides of the housing opening to said bore, ports in said piston arranged to connect some of said pipe ports as the piston occupies one of the extreme positions and disconnect others, and vice versa when in the opposite extreme position, and stuffing boxes on said piston separating the various groups of pipe ports.

11. In a structure as specified in claim 9, said ports in the piston including a bore in the piston opening at its end and connected to one of the pipe ports when the valve is tripped and adapted for discharging water at said end.

12. In a structure as specified in claim 9, a slot in the side of said piston and a device projecting into said slot limiting the sliding motion of said piston and preventing it from turning.

13. In an emergency valve provided with a slidable spring-actuated plunger piston, means holding the plunger with spring in compression comprising a disruptable support positioned between the end of the piston and an extension of the valve body, a plate on the end of said piston covering a sprinkler port therein and on which plate one end of said support rests, and means arranged and adapted for disrupting said support to trip the valve, and a water supply pipe arranged to come into communication with the sprinkler port of the piston by the movement of the piston upon disrupting said support.

14. In an emergency valve provided with a slidable spring-actuated plunger piston, means holding the plunger with spring in compression comprising a disruptable support positioned between the end of the piston and an extension of the valve body, a plate on the end of said piston covering a sprinkler port therein and on which plate one end of said support rests, a pressure adjusting screw forcing against the opposite end of said support, and means arranged and adapted for disrupting said support to trip the valve, and a water supply pipe arranged to come into communication with the sprinkler port of the piston by the movement of the piston upon disrupting said support.

KENNETH WATSON.